United States Patent
Liu

(10) Patent No.: US 8,320,401 B2
(45) Date of Patent: Nov. 27, 2012

(54) SYSTEM AND METHOD TO ACCESS AND ADDRESS HIGH-SPEED INTERFACE CONVERTER DEVICES

(75) Inventor: Patrick Chung-You Liu, Naperville, IL (US)

(73) Assignee: Foundry Networks, LLC, San Jose, CA (US)

( * ) Notice: Subject to any disclaimer, the term of this patent is extended or adjusted under 35 U.S.C. 154(b) by 35 days.

(21) Appl. No.: 12/978,968

(22) Filed: Dec. 27, 2010

(65) Prior Publication Data
US 2011/0122966 A1 May 26, 2011

Related U.S. Application Data

(60) Division of application No. 11/954,174, filed on Dec. 11, 2007, now Pat. No. 7,872,979, which is a continuation of application No. 10/364,623, filed on Feb. 10, 2003, now Pat. No. 7,317,689.

(51) Int. Cl.
*H04L 12/66* (2006.01)
(52) U.S. Cl. .................................... 370/463
(58) Field of Classification Search ......... 370/241–246, 370/252, 284, 389, 395.5–395.52, 401, 420, 370/463–465, 906; 375/219, 257; 709/249–250
See application file for complete search history.

(56) References Cited

U.S. PATENT DOCUMENTS

| | | | |
|---|---|---|---|
| 5,627,998 A | 5/1997 | Mondrik et al. | |
| 5,640,572 A | 6/1997 | Mondrik et al. | |
| 5,717,614 A | 2/1998 | Shah et al. | |
| 5,724,272 A | 3/1998 | Mitchell et al. | |
| 5,771,388 A | 6/1998 | Mondrik et al. | |
| 5,980,324 A | 11/1999 | Berg et al. | |
| 6,047,172 A | 4/2000 | Babineau et al. | |
| 6,070,251 A | 5/2000 | Chong | 714/12 |
| 6,074,228 A | 6/2000 | Berg et al. | |
| RE36,820 E | 8/2000 | McGinley et al. | |
| 6,135,793 A | 10/2000 | Babineau | |
| 6,142,802 A | 11/2000 | Berg et al. | |
| 6,149,465 A | 11/2000 | Berg et al. | |
| 6,178,096 B1 | 1/2001 | Flickinger et al. | |
| 6,179,627 B1 | 1/2001 | Daly et al. | |
| 6,185,203 B1 | 2/2001 | Berman | 370/351 |
| 6,203,333 B1 | 3/2001 | Medina et al. | |

(Continued)

OTHER PUBLICATIONS

SFF-8053 Specification for GBIC (Gigabit Interface Converter), Rev 5.5, 82 pages, Sep. 27, 2000.*

(Continued)

*Primary Examiner* — Frank Duong
(74) *Attorney, Agent, or Firm* — Graybeal Jackson LLP

(57) ABSTRACT

High-speed transceiver devices, such as GBIC-type transceivers, are accessed and addressed. Identification information (including manufacturer name, model, compliance codes) is placed in data fields of the transceivers. An algorithm checks each port in each module of a host system to determine if a transceiver is present. If a particular transceiver is present, then algorithms store the port address of the transceiver in memory and enable the transceiver to be read from or written to. Reading from the transceiver includes reading the identification information, and writing to the transceiver includes writing the identification information. If a transceiver is initially determined not to be present or if the reading/writing/enabling processes fail, then a recovery process determines if the transceiver was present the last time it was checked. If it was present the last time, then the process continues to try to recover the transceiver data—otherwise, the port is marked as empty.

20 Claims, 17 Drawing Sheets

U.S. PATENT DOCUMENTS

| | | | |
|---|---|---|---|
| 6,203,387 B1 | 3/2001 | Daly et al. | |
| 6,206,582 B1 | 3/2001 | Gilliland | |
| 6,215,666 B1 | 4/2001 | Hileman et al. | |
| 6,220,873 B1 | 4/2001 | Samela et al. | |
| 6,241,534 B1 | 6/2001 | Neer et al. | |
| 6,260,079 B1 | 7/2001 | White | 710/8 |
| 6,264,499 B1 | 7/2001 | Costello et al. | |
| 6,272,019 B1 | 8/2001 | Edwards et al. | |
| 6,295,272 B1 | 9/2001 | Feldman et al. | 370/210 |
| 6,296,514 B1 | 10/2001 | Medina et al. | 439/404 |
| 6,299,362 B1 | 10/2001 | Gilliland et al. | |
| 6,304,436 B1 | 10/2001 | Branch et al. | |
| 6,312,296 B1 | 11/2001 | Jones | |
| 6,325,636 B1 | 12/2001 | Hipp et al. | 439/61 |
| 6,351,394 B1 | 2/2002 | Cunningham | |
| 6,354,875 B1 | 3/2002 | Wu | |
| 6,364,709 B1 | 4/2002 | Jones | |
| 6,366,471 B1 | 4/2002 | Edwards et al. | |
| 6,368,153 B1 | 4/2002 | Hwang | |
| 6,386,919 B2 | 5/2002 | Medina et al. | |
| 6,400,730 B1 | 6/2002 | Latif et al. | 370/466 |
| 6,411,506 B1 | 6/2002 | Hipp et al. | |
| 6,416,361 B1 | 7/2002 | Hwang | |
| 6,418,121 B1 | 7/2002 | Flickinger et al. | 370/242 |
| 6,419,523 B1 | 7/2002 | Jones et al. | |
| 6,424,539 B1 | 7/2002 | Hwang | |
| 6,426,947 B1 | 7/2002 | Banker et al. | 370/254 |
| 6,430,053 B1 | 8/2002 | Peterson et al. | |
| 6,431,765 B1 | 8/2002 | Chen et al. | |
| D463,383 S | 9/2002 | Hwang | |
| 6,454,580 B1 | 9/2002 | Hwang | |
| D464,324 S | 10/2002 | Hwang | |
| D464,631 S | 10/2002 | Billman | |
| 6,462,435 B1 | 10/2002 | Covaro et al. | |
| 6,464,517 B1 | 10/2002 | Jones | |
| 6,468,108 B1 | 10/2002 | Wu | |
| 6,469,905 B1 | 10/2002 | Hwang | |
| 6,477,139 B1 | 11/2002 | Anderson et al. | 370/216 |
| 6,478,622 B1 | 11/2002 | Hwang | |
| 6,483,806 B1 | 11/2002 | Flickinger et al. | 370/235 |
| 6,554,492 B2 | 4/2003 | Gilliland et al. | 385/88 |
| 6,607,307 B2 | 8/2003 | Gilliland et al. | 385/88 |
| 6,751,699 B1 | 6/2004 | Langley, Sr. et al. | 710/317 |
| 6,772,270 B1 | 8/2004 | Kurpanek | 710/316 |
| 7,090,509 B1 | 8/2006 | Gilliland et al. | 439/76.1 |
| 7,317,689 B1 | 1/2008 | Liu | |
| 7,630,300 B2 | 12/2009 | Warren et al. | |
| 7,872,979 B1 | 1/2011 | Liu | |

OTHER PUBLICATIONS

Office Action, mailed Mar. 7, 2007, for U.S. Appl. No. 10/364,623, 20 pages.

Notice of Allowability, mailed Sep. 11, 2007, for U.S. Appl. No. 10/364,623, 5 pages.

SFF Committee, Proposed Specification for GBIC (Gigabit Interface Converter), Rev 5.4, Aug. 16, 1999.

SFF Committee, SFF-8472 Specification for Diagnostic Monitoring Interface for Optical Transceivers, Rev 10.4, Jan. 30, 2009.

Office Action, mailed Feb. 5, 2010, for U.S. Appl. No. 11/954,174, 9 pages.

Office Action, mailed Sep. 24, 2010, for U.S. Appl. No. 11/954,174, 15 pages.

Notice of Allowability, mailed Oct. 18, 2010, for U.S. Appl. No. 11/954,174, 6 pages.

"SFF-8053 Specification for GBIC (Gigabit Interface Converter)," Rev 5.5, Sep. 27, 2000.

\* cited by examiner

A Data Networking Equipment
- 0 represents a MiniGBIC transceiver
- M represents the module number from 1 to M
- N represents the MiniGBIC transceiver number 0(or K) to N
- ID represents each module in the data network equipment, such as xyz, abc, ccc etc.

Bit 1 to 5 return values to system management module
R = Reserved
0 = Data 0
1 = Data 1

| Memory Address | Description |
|---|---|
| ⋮ | ⋮ |
| 0x1020010 | MiniGBIC Clock |
| ⋮ | ⋮ |
| 0x1020020 | MiniGBIC 1 Address |
| 0x1020022 | MiniGBIC 2 Address |
| 0x1020024 | MiniGBIC 3 Address |
| 0x1020026 | MiniGBIC 4 Address |
| 0x1020028 | MiniGBIC 5 Address |
| 0x102002A | MiniGBIC 6 Address |
| 0x102002C | MiniGBIC 7 Address |
| 0x102002E | MiniGBIC 8 Address |

FIG. 8

| Memory Address | Description |
|---|---|
| ⋮ | ⋮ |
| 0x1020010 | MiniGBIC Enable |
| ⋮ | ⋮ |
| 0x1020020 | MiniGBIC Clock |
| 0x1020022 | MiniGBIC Address |

FIG. 9

| 0 | 1 | 1 | 1 | 1 | 1 | 1 | 1 | 0 | 1 | 0 | 1 | 1 | 1 | 1 | 0 |
|---|---|---|---|---|---|---|---|---|---|---|---|---|---|---|---|
| 16 | 15 | 14 | 13 | 12 | 11 | 10 | 9 | 8 | 7 | 6 | 5 | 4 | 3 | 2 | 1 | bit

Each bit represents the status of a MiniGBIC transceiver
0 = Present
1 = Not Present

*FIG. 10*

The above example shows the MiniGBIC transceivers present on bit positions 1, 6, 8, and 16

| X | X | X | X | X | X | X | X | 0 | 1 | 1 | 0 | 1 | 1 | 1 | 0 |
|---|---|---|---|---|---|---|---|---|---|---|---|---|---|---|---|
| 16 | 15 | 14 | 13 | 12 | 11 | 10 | 9 | 8 | 7 | 6 | 5 | 4 | 3 | 2 | 1 | bit

Each bit represents the status of a MiniGBIC transceiver
X = Don't Care
0 = Present
1 = Not Present

*FIG. 11*

The above example shows the MiniGBIC transceivers present on bit positions 1, 5 and 8.

| X | X | X | X | X | X | X | X | X | X | X | X | 0 | 1 | 1 | 0 |
|---|---|---|---|---|---|---|---|---|---|---|---|---|---|---|---|
| 16 | 15 | 14 | 13 | 12 | 11 | 10 | 9 | 8 | 7 | 6 | 5 | 4 | 3 | 2 | 1 | bit

Each bit represents the status of a MiniGBIC transceiver
X = Don't Care
0 = Present
1 = Not Present

*FIG. 12*

The above example shows the MiniGBIC transceivers present on bit positions 1 and 4.

Each bit represents the status last time of a MiniGBIC transceiver
1 = Present
0 = Not Present The above example shows the MiniGBIC storage register contains 2, 3, 5, 7, 10, 11, 14 transceivers since last read or write

|   |   |   |   |   |   |   |   |   |   |   |   |   |   |   |   |
|---|---|---|---|---|---|---|---|---|---|---|---|---|---|---|---|
| X | X | X | X | X | X | X | X | X | X | X | 0 | 1 | 1 | 1 | 0 |
| 16 | 15 | 14 | 13 | 12 | 11 | 10 | 9 | 8 | 7 | 6 | 5 | 4 | 3 | 2 | 1 | bit

Bit 1 to 5 represents the access status of enable\disable for 16 MiniGBIC transceivers
X - Don't Care
0 = Disable to access
1 = Enable to access The above example shows the MiniGBIC transceiver 14 is not accessable. $2^3 + 2^2 + 2^1 = 14$ bit position

FIG. 16

SYSTEM AND METHOD TO ACCESS AND ADDRESS HIGH-SPEED INTERFACE CONVERTER DEVICES

CROSS REFERENCE TO RELATED APPLICATIONS

The present application is a divisional that claims the benefit under 35 U.S.C. §120 to U.S. patent application Ser. No. 11/954,174, entitled "SYSTEM AND METHOD TO ACCESS AND ADDRESS HIGH-SPEED INTERFACE CONVERTER DEVICES," filed Dec. 11, 2007, which in turn is a continuation that claims the benefit under 35 U.S.C. §120 to U.S. patent application Ser. No. 10/364,623, entitled "SYSTEM AND METHOD TO ACCESS AND ADDRESS HIGH-SPEED INTERFACE CONVERTER DEVICES," filed Feb. 10, 2003, and which are incorporated herein by reference in their entireties.

BACKGROUND OF THE INVENTION

1. Field of the Invention

This disclosure relates generally to telecommunications and data networks. More particularly but not exclusively, the present disclosure relates to addressing and accessing high-speed interface converter devices, such as Gigabit Interface Converter (GBIC) devices, in a data network switching system.

2. Description of the Related Art

It is becoming increasingly important to allow enterprises to connect to high-speed data networks. These data networks include switching systems that are generally described based on the capabilities of their transmission speeds. For example, "mega" switching systems transfer millions of bits per second, while "gigs" switching systems transfer gigabits per second. Gigabit capability is designed for Internet switches and routers that provide backbone connection service for Internet service providers and enterprise networks.

The Gigabit Interface Converter (GBIC) specification (revision 5.5, Sep. 27, 2000) was developed by a group of electronics manufacturers in order to arrive at a standard small form factor transceiver for use with a wide variety of serial transmission media and connectors. The GBIC specification defines the electronic, electrical, and physical interface of a removable serial transceiver designed to operate at gigabit speeds. A GBIC provides a small form factor pluggable device that may be inserted and removed from a host or switch chassis without powering off the receiving socket. The GBIC standard allows a single standard interface to be changed from a first serial medium to an alternate serial medium by simply removing a first GBIC device and plugging in a second GBIC device having the desired alternate media interface. For instance, a GBIC device can convert an electrical signal to an optical signal for transmission through a fiber medium.

In recent years, industry has continued to develop smaller form factors and advances in technology for these transceiver devices. An example is the MiniGBIC transceiver that is capable to perform long-haul transmission with minimal signal loss. The MiniGBIC transceiver is designed to provide gigabit capability for Fiber Channel and other protocols that use the Open Systems Interconnection (OSI) physical layer. Thus, such devices can be used in synchronous optical network (SONET), asynchronous transfer mode (ATM), Internet protocol (IP), or other types of high-speed systems.

GBIC devices are generally removable serial transceiver devices. They are "hot pluggable" in that they can be easily removed or inserted from the chassis or host system, so as to change the type of interface, to upgrade with a new device, to replace broken devices, and so forth.

Because of the hot pluggable nature of these devices (e.g., constantly repeating insertion and removal), existing systems have difficulty detecting which devices are active or inactive, or which devices have been inserted and removed. In cases of failure or other malfunctions, the GBIC specification does not address file or data recovery.

Moreover, different manufacturers produce different models of high-speed interface converter devices, each having different requirements and performance parameters. For example, manufacturers produce either or both regular GBICs and MiniGBICs, as well as different types of MiniGBICs themselves (e.g., MiniGBICs for 1000 BASE-T, 1000 BASE-CX, 1000 BASE-LX, 1000 BASE-SX, and so on). A host system (such as a switch or router) can contain many different GBICs or MiniGBICs. Detection and identification of these devices (and their data), so as to properly allocate memory and to meet their operating requirements thus become important.

SUMMARY OF THE INVENTION

One aspect of the present invention provides a method for a host system having a plurality of ports for transceivers. The method includes checking a port to determine if a transceiver is present at that port. If the checking determines that the transceiver is present, the method includes at least one of reading identification information of the transceiver and writing identification information to the transceiver. If the checking determines that the transceiver is not present, the method checks if the transceiver was present a last time the port was checked, and performs a recovery process if the transceiver is determined to be present the last time the port was checked.

BRIEF DESCRIPTION OF THE DRAWINGS

FIG. 8 illustrates a memory addressing technique to store addresses of transceivers in accordance with an embodiment of the invention.

FIG. 9 illustrates a memory addressing technique to store addresses of transceivers in accordance with another embodiment of the invention.

FIG. 10 illustrates an embodiment of a memory register that indicates whether transceivers are present in a module.

FIG. 11 illustrates another embodiment of a memory register that indicates whether transceivers are present in a module.

FIG. 12 illustrates yet another embodiment of a memory register that indicates whether transceivers are present in a particular module.

FIG. 16 illustrates an embodiment of an enable memory register.

DETAILED DESCRIPTION

Figure 1:
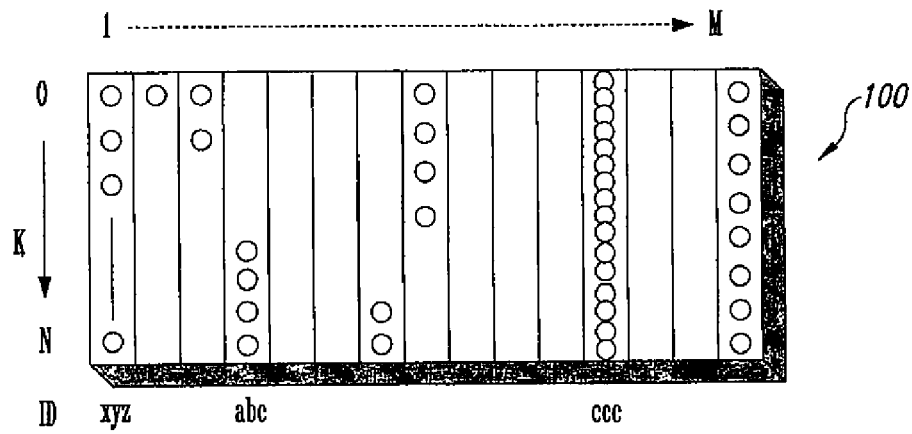
FIG. 1 illustrates a high-speed switching system with which an embodiment of the invention may be implemented.

Embodiments for accessing and addressing high-speed interface converters are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The present disclosure relates to pluggable electronic devices configured to connect and/or convert data signals from a first serial transmission medium to a second serial transmission medium. Various embodiments of the invention will be described herein in the context of a GBIC (or MiniGBIC) as defined by the GBIC specification, the teaching of which is hereby incorporated herein by reference. However, it is appreciated that the principles disclosed in this specification are applicable to high-speed data communication devices other than GBIC-type devices.

As an overview, embodiments of the invention provide systems and methods for accessing and addressing high-speed interface devices, such as GBIC-type transceiver devices. Identification information (such as manufacturer name, product type/model, gigabit Ethernet compliance codes, and the like) is placed in serial data fields of the transceivers. A plurality of transceivers can be placed in numbered ports in modules of a host system or chassis, and are hot pluggable in that they can be instantaneously and repetitively inserted, removed, re-inserted, etc. while the host system is operating, without having to power down the host system.

An embodiment of the invention provides an algorithm to sequentially check each port in each module to determine if a transceiver is present therein. If a particular transceiver is determined to be present, then algorithms and data structures are provided to store the port address of the transceiver in memory and to enable the transceiver to be read from or written to. Reading from the transceiver can comprise reading the identification information (or other information) directly from the transceiver's serial data fields in its EEPROM (or other storage unit) or from input/output (I/O) registers coupled to the transceiver(s). Writing to the transceiver can comprise writing the identification information (or other information) directly to the EEPROM or to one of the I/O registers. Reading, writing, storage, or other operations can be performed in accordance with clock cycles or bit status.

If a transceiver is initially determined not to be present or if the reading/writing/enabling processes fail, then an embodiment of the invention provides a process to determine if the transceiver was present the last time it was checked. If it was present the last time, then the process continues to try to recover the transceiver data—otherwise, the port is marked as empty with no transceiver present. This recovery process addresses situations where the particular transceiver may have been removed and then re-inserted, so as to avoid an erroneous determination that the port is empty.

FIG. 1 illustrates a high-speed switching system 100 with which an embodiment of the invention may be implemented. The system 100 can include a chassis or other arrangement that is integrated with (or otherwise communicatively coupled to) a network component, such as a switch, router, server, or other type of suitable host device. The system 100 may comprise a MiniGBIC system in one embodiment.

The system 100 comprises M modules numbered from 1 to M, inserted into slots of the chassis. Each module has 0 to N MiniGBIC ports, some or all of which may have MiniGBIC transceivers/devices (represented by small circles in FIG. 1) inserted therein at any instant of time. These MiniGBIC transceivers are hot pluggable into the ports, thereby allowing constant insertion and removal without having to power down the system 100.

Each module may also start from K and terminate to N. Each module inside of a slot in the system 100 has its own module identifier (ID), which are illustratively indicated as xyz, abc, ccc, etc. in FIG. 1.

Figure 2:
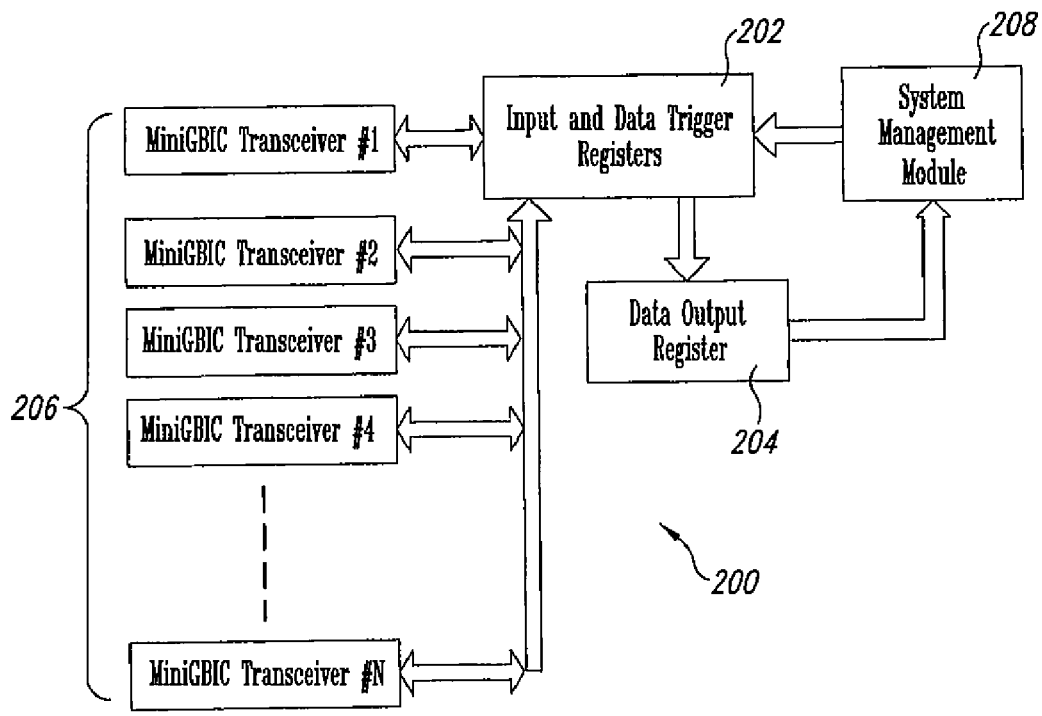
FIG. 2 is a block diagram of a module for the system of FIG. 1 in accordance with an embodiment of the invention.

FIG. 2 is a block diagram of a module 200 for the system 100 of FIG. 1 in accordance with an embodiment of the invention. As illustrated, the module 200 includes 1 to N MiniGBIC transceivers 206. For use in connection with input and output of data, the module 200 includes at least one input and data trigger register 202 and at least one data output register 204 that are coupled to the transceivers 206. In an embodiment, each module 200 includes a single register 202 and a single register 204 for all of the transceivers 206 in the module. In another embodiment, multiple registers 202 or 204 may be present in a single module 200.

A system management module 208 is communicatively coupled to the registers 202 and 204. The management module 208 includes software and hardware to control various operations related to the transceivers 206, which will be explained later below. A single management module 208 may be used for all of the modules 1 to M in the system 100, or there may be separate management modules 208 for at least some of the modules 1 to M. The management module 208 may be located externally to the modules 1 to M, such as in the form of software code or other machine-readable instruction stored on a machine-readable medium that is accessible by the operating system (OS) software of the system 100.

Figure 3:
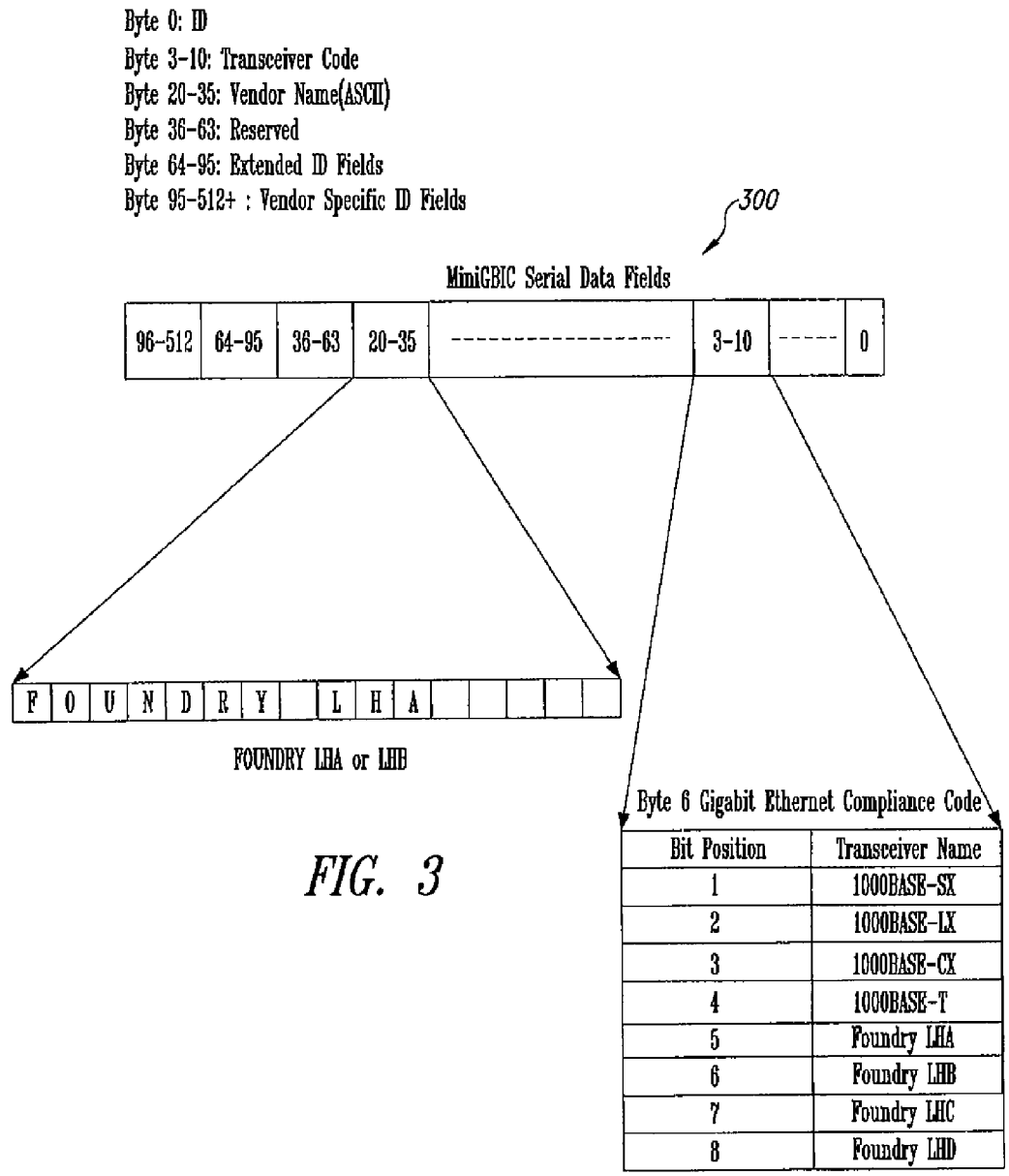
FIG. 3 shows serial data fields of a transceiver for the system of FIG. 1 in accordance with an embodiment of the invention.

FIG. 3 shows serial data fields of a transceiver for the system 100 of FIG. 1 in accordance with an embodiment of the invention. In particular, FIG. 3 shows serial data fields 300 for any one of the MiniGBIC transceivers 206 of FIG. 2. These serial data fields 300 correspond to those defined under the Module Definition "4" of the GBIC specification, with some additional features that are provided by an embodiment of the invention. Bytes 0, 36-63, 64-95, and 96-512+ are fully explained in the GBIC specification, and therefore will not be described in detail herein for the sake of brevity.

Bytes 3-10 relate to transceiver electronic or optical compatibility codes. In particular for one embodiment, Byte 6 relates to Gigabit Ethernet compliance codes, where bit positions 1-4 identify electronic or optical interfaces that are supported by the particular MiniGBIC transceiver 206. Furthermore, bit positions 5-8 identify any manufacturer-specific electronic or optical interfaces with which that particular MiniGBIC transceiver 206 can operate. For example in FIG. 3, bit positions 5-8 of Byte 6 are respectively assigned to Foundry Networks' (of San Jose, Calif.) Gigabit Ethernet products LHA, LHB, LHC, and LHD. By setting any of the bits in Byte 6 (e.g., setting any of the bits to a binary 1), that particular transceiver 206 is defined to support the corresponding Gigabit Ethernet specification. Unset bits (e.g., a binary 0) indicate that the particular transceiver 206 does not support the corresponding Gigabit Ethernet specification.

Figure 4:
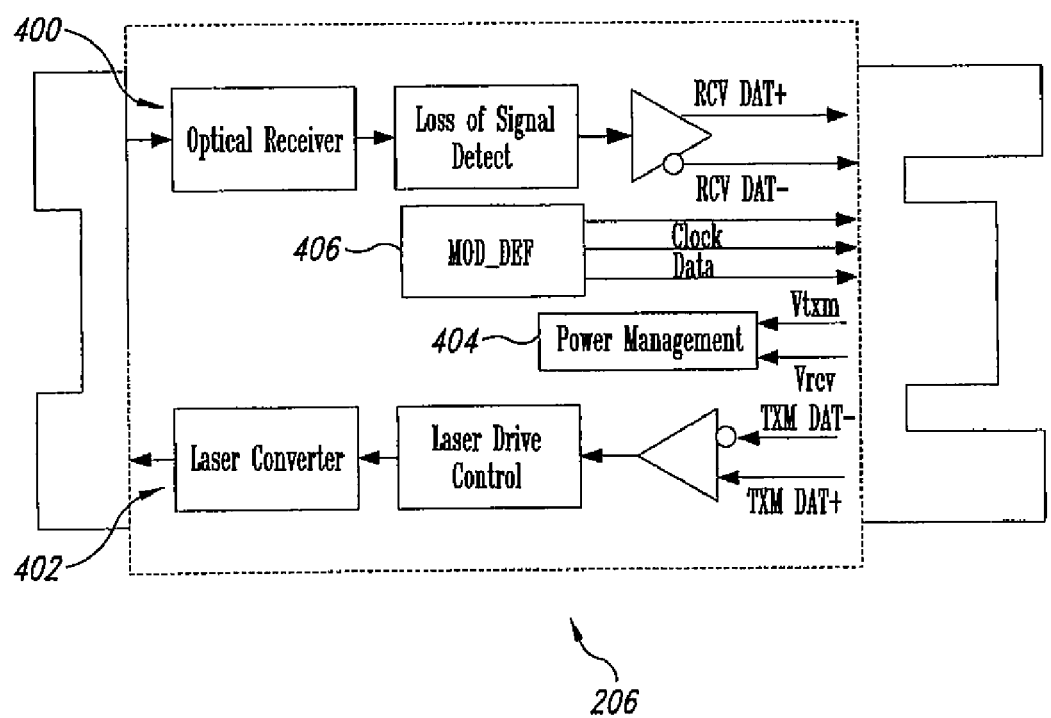
FIG. 4 is a block diagram of an embodiment of a transceiver.

An embodiment of the invention places vendor information and transceiver names in Bytes 20-35. In the example of FIG. 4, "Foundry" is the vendor name (e.g., the manufacturer of the particular MiniGBIC) and "LHA" is the name/model of the particular transceiver 206, which can be a type of GBIC, MiniGBIC, or other transceiver type.

FIG. 4 is a block diagram of an embodiment of a transceiver 206. A first circuit branch 400 comprises receiver circuitry to receive optical data from a high-speed data network. A second circuit branch 402 comprises transmission circuitry to transmit optical data (converted from electronic data) to the high-speed data network. A power management block 404 manages the power usage of the transceiver 206. Further details of the branches 400-402 and of the power management block 404 may be obtained from the GBIC specification, and are not described in further detail herein for the sake of brevity.

In an embodiment of the invention, the transceiver 206 includes a module definition block 406, which contains the serial data fields as defined (by way of example) in FIG. 3. The module definition block 406 comprises a 2-wire serial EEPROM (or other suitable storage medium), in an embodiment, that uses a protocol defined for the ATMEL AT24C01A/02/04 family of components. Data is written into the EEPROM during positive edges of a clock signal, while data is read from the EEPROM during negative edges of the clock signal.

Figure 5:
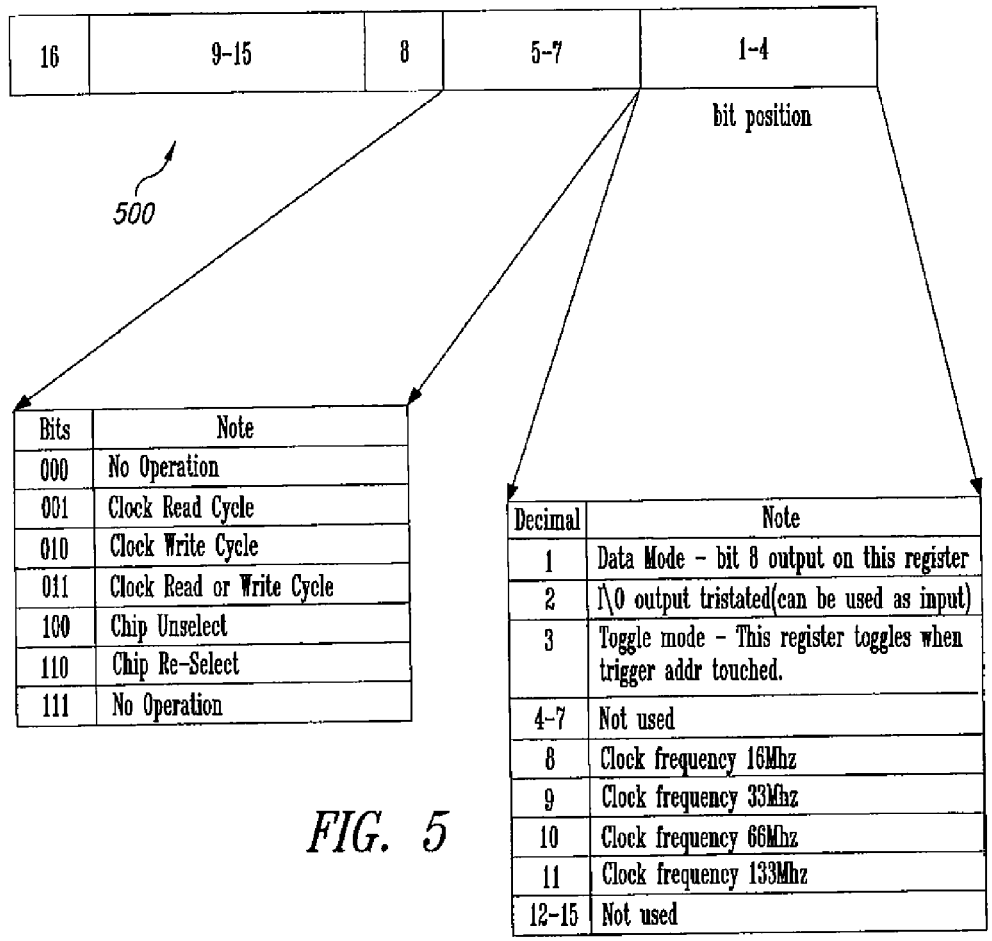
FIG. 5 illustrates example bit designations for input and data trigger registers for a module in accordance with an embodiment of the invention.

FIG. 5 illustrates example bit designations 500 for the input and data trigger registers 202 of FIG. 2 for a module 200 in accordance with an embodiment of the invention. These bit designations 500 define various modes and other settings. These modes include reading from or writing to the EEPROM of a transceiver 206, toggling between reading and writing, toggling from one port to another port, and so forth.

In the bit positions 1-4 (corresponding to decimal values 0-15), various settings are made. For example, if the content of bit positions 1-4 is binary 1001 (decimal 9), the clock frequency (used for reading from or writing to the transceiver EEPROM) is at 33 MHz. Various clock frequencies may be set in the bit positions 8-11 (decimal) or in other bit positions.

If the content of bit positions 1-4 is binary 0001 (decimal 1), the register 202 is in a data mode where it outputs a value (at bit position 8) to the output data register 204. If the content of bit positions 1-4 is a binary 0010 (decimal 2) set low, the register 202 in an input mode where it writes to the EEPROM of the transceiver 206—otherwise the output is tristated, for use when reading the transceiver data when bit 2 is set high. If the content of the bit positions 1-4 is a binary 11 (decimal 3), the register 202 toggles between reading and writing, or between selecting and unselecting a particular transceiver 206.

If the bit positions 1-4 is defined for the toggle mode or chip select mode, the bit positions 5-7 define reading cycles of the clock (binary 001), writing cycles of the clock (binary 010), chip unselect (binary 100), chip re-select (binary 110), and so forth. For example, when in the reading clock cycle (binary 001 in bit positions 5-7), data is read from the EEPROM of the transceiver 206 and stored at the bit position 8.

Figure 6:
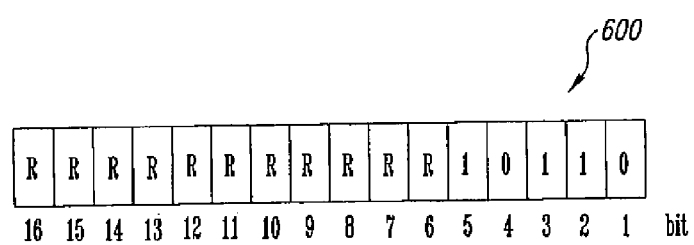
FIG. 6 illustrates example content of a data output register for a module in accordance with an embodiment of the invention.

FIG. 6 illustrates example content 600 of the data output register 204 of FIG. 2 for a module 206 in accordance with an embodiment of the invention. The content 600 is written into the data output register 204 based on the bit designations of FIG. 5. That is, as an example, each individual bit entry of the content 600 might be placed into the data output register 204 (e.g., reading from the serial data fields 300) when the bit designations 500 of FIG. 5 indicates a decimal 1 (bit 1 high) in bit positions 1-4 (data mode), binary 001 (clock read cycle) in bit positions 5-7 set high, bit 16 high (clock trigger output), and a binary 1 or 0 (data value) in bit position 8.

In the example of FIG. 6, binary 1s are present in bit positions 2, 3, and 5 (with reserved R or binary 0 in other bit positions), thereby obtaining binary 10110 (decimal 22). This content 600 in the data output register 204, therefore, indicates that there is a transceiver 206 present in port #22 of that particular module 206. Different binary outputs will identify the various port numbers where a transceiver 206 is present, while a binary 00000 indicates that no transceiver 206 is present in the port. The content 600 is provided to the system management module 208—the information provided to the system management module 208 may be binary 10110 itself—to indicate that a transceiver is present in that port. Alternatively, the information provided to the system management module 208, when it knows that it is checking port number 22, may be a binary 1 or 0 that indicates whether a transceiver 206 is present or not at that port number.

The content 600 of FIG. 6 in the data output register 204 may also comprise data other than the port number of the transceiver 206. For example, the content 600 can comprise at least some of the data from the serial data fields 300 of FIG. 3.

Figure 7:
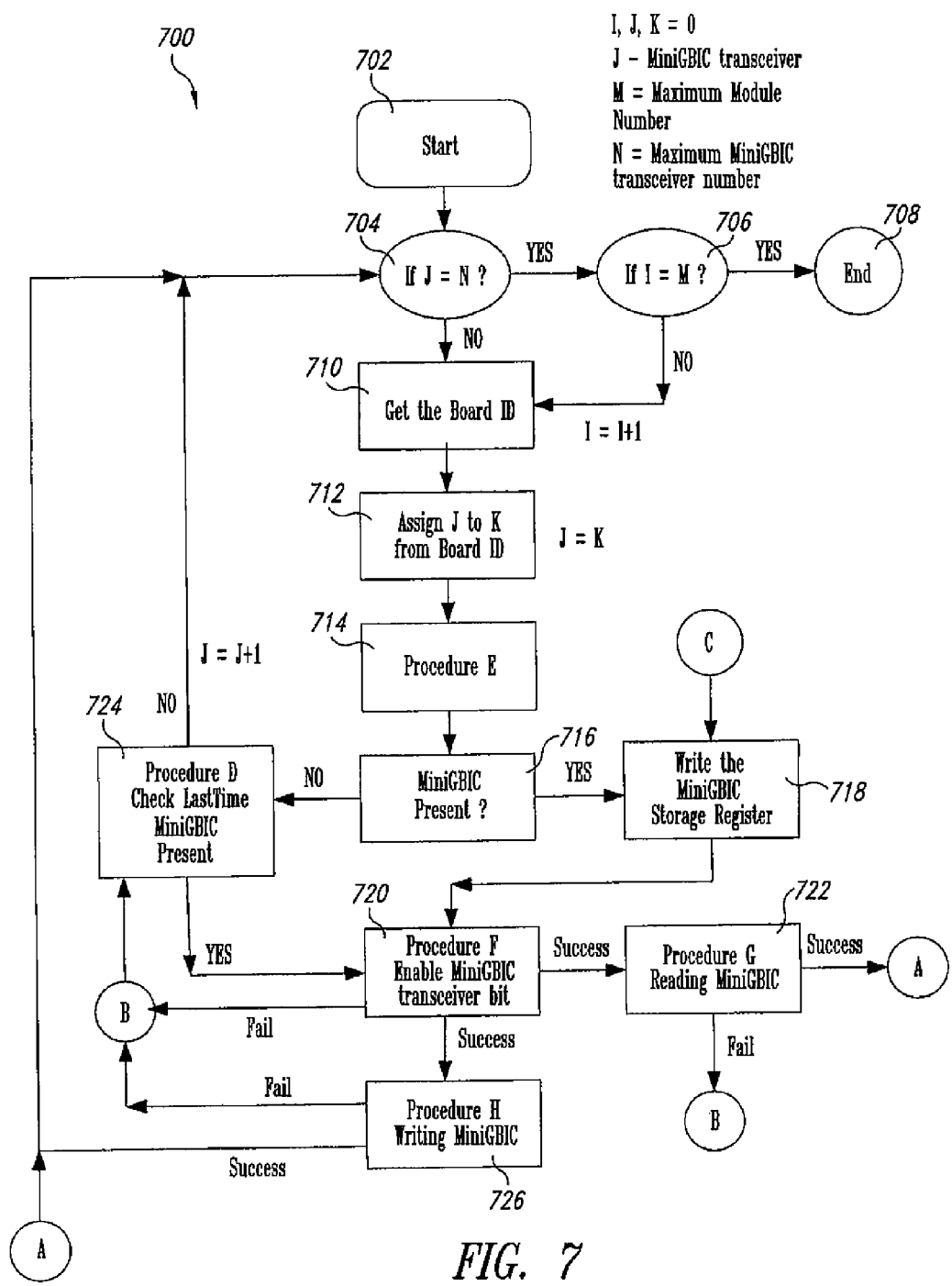
FIG. 7 is a flowchart of an embodiment of a task scheduler algorithm performed by an operating system software for the system of FIG. 1.

FIG. 7 is a flowchart 700 of an embodiment of a task scheduler algorithm performed by the operating system software of the system 100. More particularly, the flowchart 700 depicts an algorithm to check for the presence of a transceiver 206 in each port 1 to N, for each module 1 to M. The flowchart 700 also depicts additional sub-algorithms (which will be explained later below with reference to additional figures) related to error recovery, reading transceiver data, writing transceiver data, enabling transceiver(s), and so forth. The system management module 208 can cooperate with the operating system to perform the algorithm. The flow relationships and directions, between individual components of the flowchart 100 and/or between components of the flowchart 700 and other figures, are indicated by encircled letters A, B, and C.

At least some of the elements of the flowchart 700 and other flowcharts described herein may be implemented in software code or other machine-readable instruction stored on a machine-readable storage medium. Such software, for instance, may be stored in memory of the host system and executable by one or more processors. Moreover, it is appreciated that the various operations need not necessarily be performed in the exact order shown in the flowcharts, and that some operations may be combined or eliminated in some embodiments.

At a block 702, initial values (zero) are set for I (number of modules 1 to M in the system 100), J (number 1 to N of transceivers 206 in each module), and K (port number). The algorithm runs every 100 ms, for example, and goes through every module in each slot and goes through each port in each module to determine if a transceiver is present therein. The recurring process to check each module and port is depicted in blocks 704 (to check if the last port has been reached) and 706 (to check if the last module has been reached), until the algorithm ends at a block 708.

If the last port and module has not been reached, the board ID (e.g., module ID) is obtained at a block 710. From the module ID, the beginning port number and the maximum number of ports in that particular module can be determined. The current value of J (e.g., the current port number) is assigned to K at a block 712.

At a block 714, the algorithm checks whether a transceiver 206 is present on the current port. An embodiment of a sub-algorithm (Procedure E) to determine whether a transceiver 206 is present is described later below with reference to FIG. 13. If a transceiver is determined to be present at a block 716, then the algorithm writes the bit representing the port number of the transceiver 206 into a storage register 1400 of each module of the system 100 at a block 718 (see, e.g., FIG. 14). This writing at the block 718 is performed to identify, for the host system, the particular transceiver present in a particular port.

Next at a block 720, a sub-algorithm (Procedure F) is performed to enable or disable the current transceiver 206. An embodiment of Procedure F is described in further detail below with reference to FIG. 17, and involves setting certain bits in the enable memory register of the particular transceiver 206. If the transceiver is successfully enabled at the block 720, the data is read from the transceiver 206 at a block 722. An embodiment of a sub-algorithm (Procedure G) to read data from the transceiver 206 is described later below with reference to FIG. 18. Reading the data from the transceiver 206 can include, for instance, reading the contents of the serial data fields 300 of FIG. 3 or reading other data. Upon successful completion of the data read at the block 722, the algorithm repeats for the next port. Alternatively or in addition, data may be written into the transceiver 206 at a block 726 (Procedure H). An embodiment of Procedure H is described in further detail with reference to FIG. 19, and can include, for instance, writing data into the serial data fields 300 or into other data fields.

If a transceiver 206 is determined to not be present at the block 716, enablement of the transceiver 206 is unsuccessful at the block 720, or there is a failure in reading or writing data at the blocks 722 and 726, then Procedure D at a block 724 is performed to check the last time that particular transceiver 206 was present, which is described in further detail with reference to FIG. 15 and deals with error recovery and hot plugging issues.

FIG. 8 illustrates a memory addressing technique to store addresses 804 of transceivers 206 in accordance with an embodiment of the invention. A memory 800 may be located in the host system (e.g., system memory), external to the modules 1 to M, and includes a plurality of memory addresses 802. Each memory address 802 includes an address 804 of a transceiver 208 in the particular module, where the transceiver address 804 is the port number/address in the module. The number of memory addresses 802 can increase based on how many transceivers 206 are in the module.

In an embodiment, each module utilizes a clock that it uses to drive the data into the memory 800. A separate memory address 806 can be provided for the clock.

FIG. 9 illustrates a memory addressing technique to store addresses of transceivers 206 in accordance with another embodiment of the invention. A memory 900, such as a memory of the host system, uses only one data register to store a transceiver address 906, as compared to 8 data registers in the memory 800 of FIG. 8. Separate addresses 902 and 904 are respectively provided for an enable register and a clock. The memory addressing technique of FIG. 9 uses the enable register and clock to selectively output, one at a time, the current transceiver's address 906 (from the data output register 204) into the memory 900.

FIG. 10 illustrates an embodiment of a memory register 1000 that indicates whether transceivers are present in a particular module. The memory register 1000 may comprise one of the data output registers 204 for a module and/or a memory register that is external to the modules, such as a memory register of the host system (e.g., system memory).

Based on the module ID obtained at the block 710 in the flowchart 700 of FIG. 7, the modules may have different numbers of ports (and therefore transceivers) that it carries. In the example of FIG. 10, there are 16 bits in the memory register 1000, which corresponds to 16 ports (or GBIC transceiver number N=16) in the particular module.

Each bit represents the status of a transceiver 206. A binary 1 represents that a transceiver 206 is not present at that port, while a binary 0 represents that a transceiver 206 is present at that port. The binary 0s at the bit positions 1, 6, 8, and 16, therefore indicate that a transceiver 206 is present at these numbered ports. In an embodiment, data (binary 0 or 1) is written into the memory register 1000 during the writing process at the block 718 of FIG. 7.

FIG. 11 illustrates another embodiment of a memory register 1100 that indicates whether transceivers are present in a particular module. The memory register 1100 represents up to 8 transceivers 206 in the module, since the memory register 1100 has 8 bits of valid data. The other 8 bits X represent DON'T CARE bits. In this example, transceivers 206 are present in ports 1, 5, and 8.

FIG. 12 illustrates yet another embodiment of a memory register 1200 that indicates whether transceivers are present in a particular module. The memory register 1200 represents up to 4 transceivers 206 in the module, since the memory register 1200 has 4 bits of valid data. The other 12 bits X represent DON'T CARE bits. In this example, transceivers 206 are present in ports 1 and 4.

Figure 13:
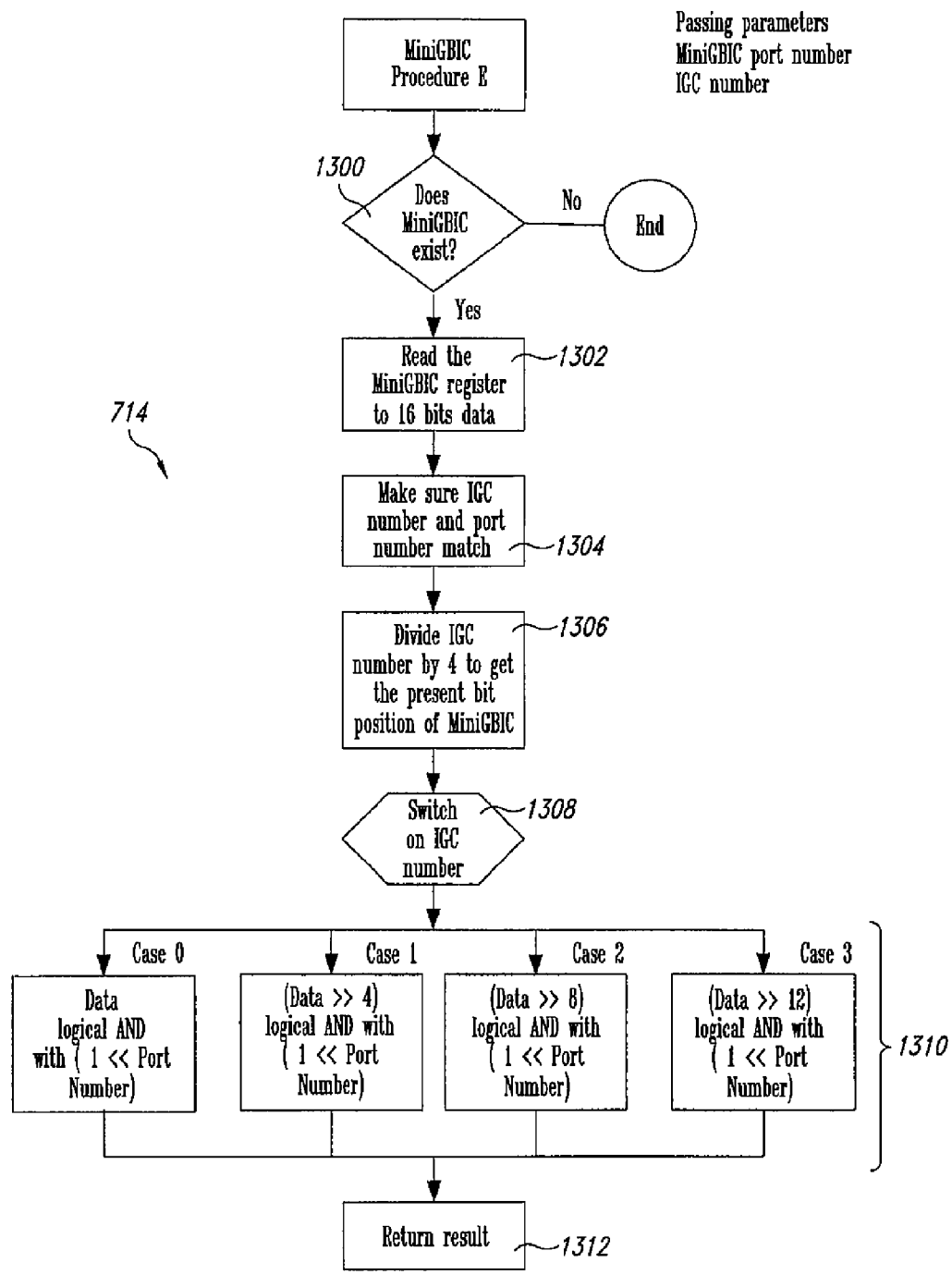
FIG. 13 is a flowchart of an embodiment of a procedure to check whether a transceiver is present.

FIG. 13 is a flowchart of an embodiment of a procedure (Procedure E at the block 714 from FIG. 7) to check whether a transceiver is present in a module. In one embodiment, an integrated gigabit controller (IGC), such as those available on the market can be used to perform Procedure E. It is appreciated that a person skilled in the art having the benefit of this disclosure may implement other types of procedures for checking or otherwise verifying if transceivers 206 are present in a particular module. Beginning at a block 1300, the IGC checks whether the current module is a gigabit module (e.g., whether the module is a type that can support GBIC or MiniGBIC). If it is not, then the procedure ends.

Otherwise, the IGC reads the memory registers 1000, 1100, or 1200 (From FIGS. 10-12) at a block 1302. As previously described, the example memory registers 1000, 1100, or 1200 may have up to 16 bits of data, and it is assumed in this example, for illustrative purposes, that the particular IGCs have 4 ports corresponding to 4 transceivers 206.

At a block 1304, Procedure E makes sure that the IGC numbers and port numbers match. That is, for instance in embodiments where each IGC has 4 ports and where each module has 16 port numbers, the corresponding mapping functions can be as follows: IGC #1 (port numbers 1-4), IGC #2 (port numbers 5-8), IGC #3 (port numbers 9-12), and IGC #4 (port numbers 13-16). Since the IGC number and port/MiniGBIC number are passed into these functions, the process at the block 1304 makes sure that there is a match before proceeding further.

At a block 1306, the 16-bit data (from the memory registers 1000, 1100, or 1200) represents 4 IGCs. The 16-bit data is divided by 4 to get the bit positions of the transceivers 206 that correspond to each IGC.

At a block 1308, based on each IGC, each IGC has 4 port numbers. Each IGC (identified by its number) is switched on at the block 1308 to test the bit set corresponding to that IGC.

For example in the blocks 1310, for Case 1 (for the corresponding IGC associated with bit positions 5, 6, 7, 8), the 16-bit data (from the block 1302) is shifted 4 bits from bit positions 1-4 to test if the port numbers 5-8 passed into the function. Testing is done by performing a logical 1 AND operation with the port numbers of the IGC. For instance for the IGC of Case 1 corresponding to bit positions 5, 6, 7, 8 and with reference to the memory register 1000 of FIG. 10 (having example binary bits 0101 in bit positions 8-5, where binary 1 represents presence, and binary 0 represents non-presence), a logical 1 applied at the block 1310 (via an AND operation with each of these bit positions) would yield a binary 1 if a transceiver 206 is present in the port and a binary 0 if not present. These results are returned at a block 1312.

In one embodiment, the logical 1 AND is applied successively to each port of each IGC that is mapped to a bit position. A logical 1 or 0 returned or output from the IGC indicates whether a transceiver 206 is present at the module port corresponding to that bit position.

Figure 14:
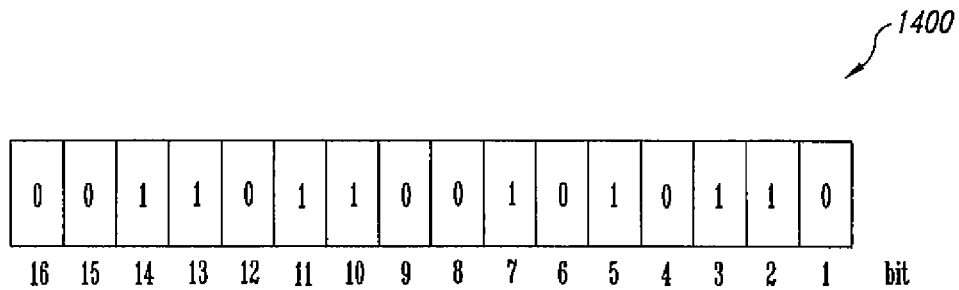
FIG. 14 illustrates a storage register that can be used to store a status of transceivers from a prior check according to an embodiment of the invention.

As described above, certain situations require the system 100 to check whether one or more transceivers 206 were present since the last check. Example situations that require this historical information include instances of hot insertion or removal of transceivers 206, error or failure that require recovery of previous transceiver data, reading or writing failure, or other situations. FIG. 14 illustrates a storage register 1400 that can be used to store the status of transceivers 206 from a prior check (e.g., since the last time the transceivers' status was checked) according to an embodiment of the invention. The storage register 1400 may be located in system memory of the host system or at other suitable memory location (including the data output register 204) where the register data can be accessed during performance of the algorithm. In one embodiment, the storage register 1400 may be the same physical registers as the memory registers 1000, 1100, or 1200 of FIGS. 10-12, before these registers are over-written with new data after each check.

In the example storage register 1400 of FIG. 14, there are 16 bits that represent 16 ports of the module. Each bit represents the status of a transceiver 206 at that port since the last time that port was checked to determine if a transceiver is present. A binary 1 represents that a transceiver 206 was present at the last check, while a binary 0 represents that a transceiver was not present at the last check. The illustrated storage register 1400, therefore, indicates that transceivers 206 were present at ports 2, 3, 5, 7, 10-11, and 13-14 at the last check.

Figure 15:
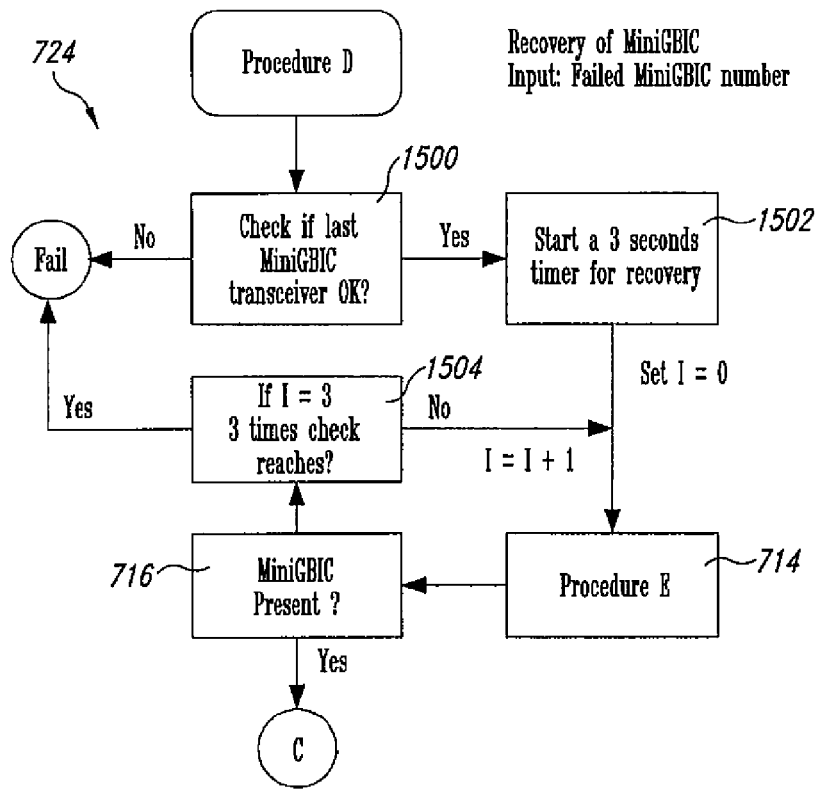
FIG. 15 is a flowchart of an embodiment of a procedure to check for presence of a transceiver using the prior status provided by the storage register of FIG. 14.

FIG. 15 illustrates an embodiment of Procedure D from the block 724 of FIG. 7. Specifically, Procedure D is performed if Procedure E (FIGS. 7 and 13) detect that a transceiver 206 is not present in the current port. This detection of non-presence by Procedure E can signify that there truly is an empty port, or a failure or hot instantaneous removal/insertion may have occurred. In the latter case, a transceiver is in fact present in the port but has been initially determined to be not present by Procedure E. Therefore, Procedure D of FIGS. 7 and 15 is performed as a type of redundant check for transceiver presence for situations where there may be instantaneous transceiver insertion and removal.

Beginning at a block 1500, the algorithm checks if the particular transceiver 206 was present at the last check. This operation may be performed by reading the storage register 1400 of FIG. 14 to obtain the status information from the last check. If the storage register 1400 indicates that the transceiver was also not present at the last check, then there is a failure or empty port, and the storage register 1400 is updated accordingly with a binary 0.

If, however, the storage register 1400 indicates at the block 1500 that a transceiver 206 was present at the last check, then a 3-second (or other suitable time span) timer is started at a block 1502. The procedure goes into a recovery process (block 714 for Procedure E and block 716) every 3 seconds (or other consecutive time span) to check if the transceiver is present in that port. If the transceiver is detected to be not continuously present 3 times (I=3) at a block 1504, then the port is marked as an empty port in the storage register 1400. Otherwise, the port is marked in the storage register 1400 as having a transceiver 206 present therein at "C," which would be the situation where a transceiver 206 may have just been inserted.

FIG. 16 illustrates an embodiment of a MiniGBIC enable memory register 1600, which may be located in system memory. The enable memory register 1600 indicates whether a particular transceiver 206 is enabled or disabled. If enabled, a transceiver 206 is accessible and can have data read from (or written to) it. If disabled, a transceiver 206 is inaccessible and cannot have data read from (or written to) it.

There may be various different embodiments of the enable memory register 1600. In one embodiment, the enable memory register 1600 contains a binary value of the port/transceiver number that is enabled or disabled. For example, FIG. 16 shows the enable memory register 1600 as storing binary 01110 (decimal 14), indicating that the transceiver 206 at port #14 is disabled. In another embodiment, the enable memory register 1600 can contain a plurality of bit positions (e.g., 16 bits for a module having 16 transceiver ports), wherein each bit position represents a port number for the module. Binary 1s or 0s can respectively indicate whether the transceiver 206 at the corresponding port number is enabled or disabled, while Xs indicate DON'T CARE status.

Figure 17:
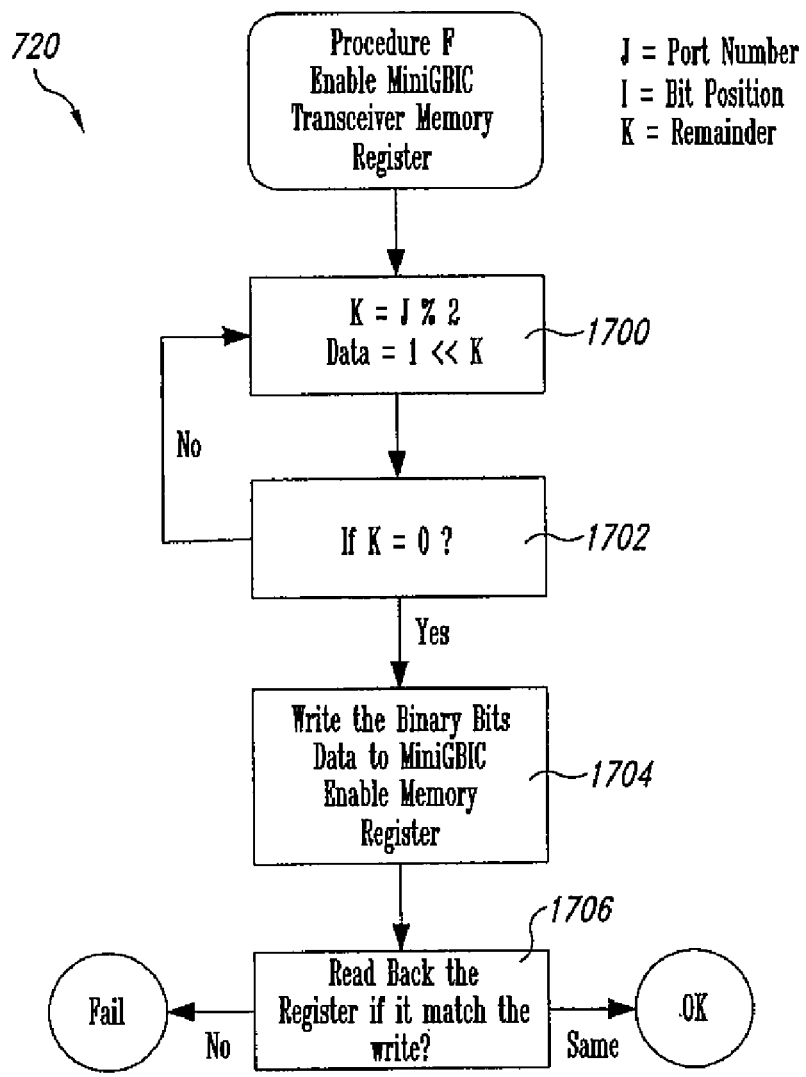
FIG. 17 is a flowchart of an embodiment of a procedure to enable or disable a transceiver.

FIG. 17 is a flowchart of an embodiment of a procedure (Procedure F from the block 720 of FIG. 7) to enable or disable a transceiver 206. An input (e.g., port number of the current transceiver) is first received, such as from the block 718 of FIG. 7. An embodiment then converts, at blocks 1700 and 1702, the port number to binary digits using a formula that shifts the bit position. At a block 1704, Procedure F then writes the binary digits to the enable memory register 1600.

Afterwards at a block 1706, Procedure F reads back from the enable memory register 1600 to confirm whether the data read from the enable memory register 1600 matches the data that was written at the block 1704. If there is a match (e.g., correct), then the transceiver 206 is enabled and can now be read from or written to in accordance with subsequent blocks 722 (Procedure G) or 726 (Procedure H) in FIG. 7. If, however, there is no match in data, then there is a failure that necessitates a recovery process in accordance with the block 724 (Procedure D).

Figure 18:
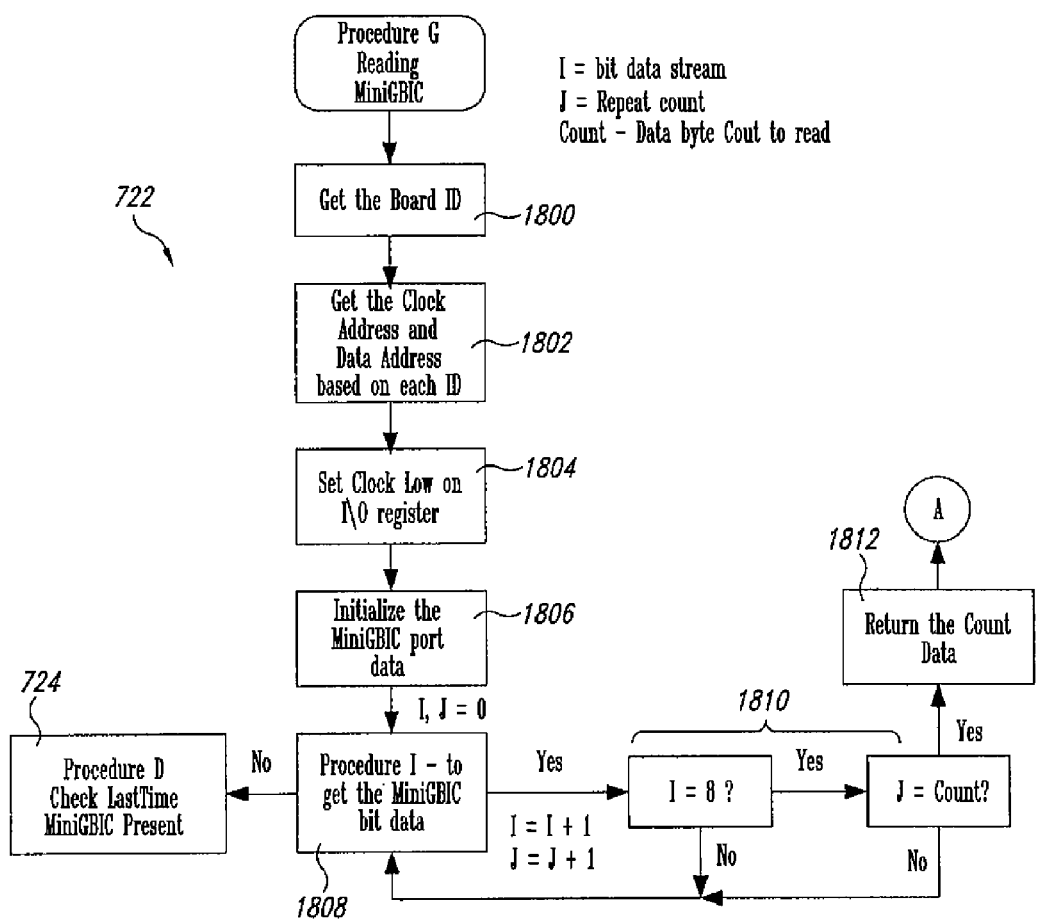
FIG. 18 is a flowchart of an embodiment of a procedure to read data from a transceiver.

FIG. 18 is a flowchart of an embodiment of a procedure (Procedure G from the block 722 of FIG. 7) to read data from a transceiver 206. More specifically, Procedure G can be used to read data (see, e.g., FIG. 6) from the data output register 204, which in turn may have received data from the serial data fields 300 of FIG. 3. Procedure G may also be used to read directly from the serial data fields 300, without necessarily having to read from the data output register 204.

At a block 1800, Procedure G gets the board ID (e.g., module ID). Based on the ID at a block 1802, the clock address and the transceiver data address are obtained from the memories 800 or 900 of FIG. 8 or 9, respectively. The clock for the data output register 204 is initialized/set low at a block 1804, and the transceiver data (bit stream from the port) is also initialized at 0 at a block 1806.

A block 1808 relates to a procedure (Procedure I), described in further detail with reference to FIG. 21, to get the transceiver bit data from the data output register 204 (or directly from the serial data fields 300). If there is a failure in obtaining the transceiver data during Procedure I, then Procedure D is performed at the block 724 to check the data from the last time (see, e.g., FIG. 15). Procedure I is performed until all of the transceiver data is read, using counts at block(s) 1810, until the transceiver data is returned at a block 1812 to confirm that all of the transceiver data has been read successfully.

Figure 21:
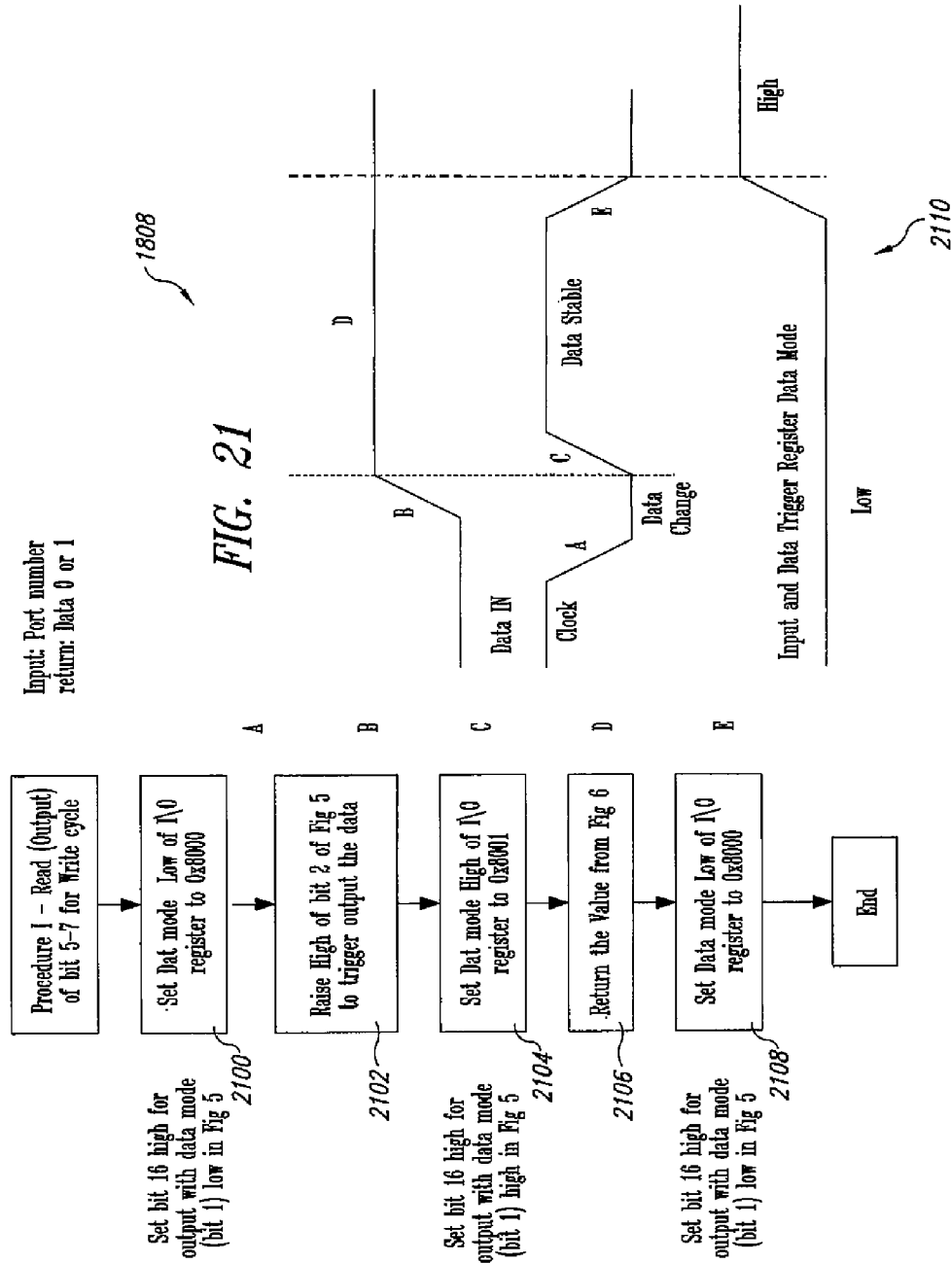
FIG. 21 is a flowchart of an embodiment of a procedure to get data from a transceiver.

FIG. 21 is a flowchart of an embodiment of Procedure I (from the block 1808 of FIG. 18) to get data from a transceiver 206. The illustrated embodiment of Procedure I is explained herein in the context of the bit designations 500 of FIG. 5 and in the context of FIG. 6 that shows the example content 600 of the data output register 204. If there is a failure in reading the data during Procedure I, then Procedure D from FIGS. 7 and 15 is performed to recover data from the last time the particular transceiver 206 was read.

At a block 2100, bit 16 (from the bit designations 500 of FIG. 5) is set high to allow the module clock to trigger an output. If the data mode in bit 1 (from the bit designations 500 of FIG. 5) is low (corresponding to a binary 0 data bit in bit 8), then bit 2 of FIG. 5 is raised high to trigger the output of data at a block 2102—raising bit 2 high tristates the I/O output register to a non-input state.

At a block 2104, bit 16 is once again set high to allow the module clock to trigger an output. If the data mode in bit 1 of FIG. 5 is high (corresponding to a data change to a binary 1 data bit in bit 8), then the value from the content 600 of FIG. 6 is returned at a block 2106.

A block 2108 depicts the next data change (to a binary 0 data bit), where bit 16 is again set high to allow the module clock to trigger an output, and the data mode in bit 1 is low for the binary 0 data bit. Timing diagrams 2110 further illustrate the clock cycles, transitions, data stream, and other operations described above.

Figure 22:
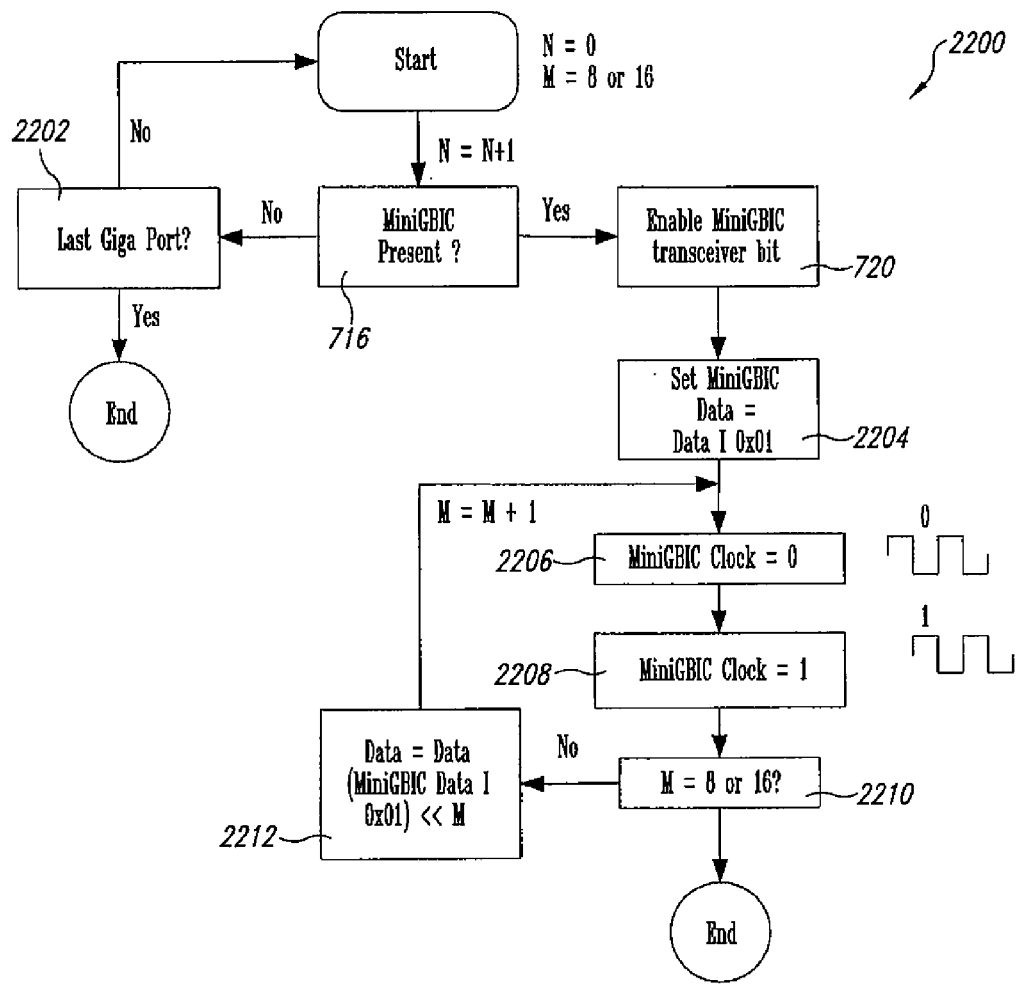
FIG. 22 is a flowchart of another embodiment of a procedure to read data from a transceiver.

FIG. 22 is a flowchart of another embodiment of a procedure 2200 to read data from a transceiver 206. The procedure 2200 may be used in addition or alternative to the Procedures G and I of FIGS. 18 and 21, respectively. The procedure 2200 is performed sequentially for each port in a module, where a block 2202 checks whether the last port in the module has been reached or read. Blocks 716 (to determine presence of a transceiver 206 in the port) and 720 (to enable the transceiver 206 in the port to be read from) are performed similarly as previously described above.

At a block 2204, for the current transceiver 206, a storage register is set and initialized to receive the read data. Then at consecutive clock low and high cycles at blocks 2206 and 2208, data is read from the transceiver 206, which may be read from the data output register 204 (see also FIG. 6) or directly from the EEPROM. A block 2210 repetitively checks whether the last bit in the data output register 204, such as bit 8 or bit 16, has been reached. If the last bit has not been reached, the data continues to be read and placed in the storage register at a block 2212.

Figure 19:
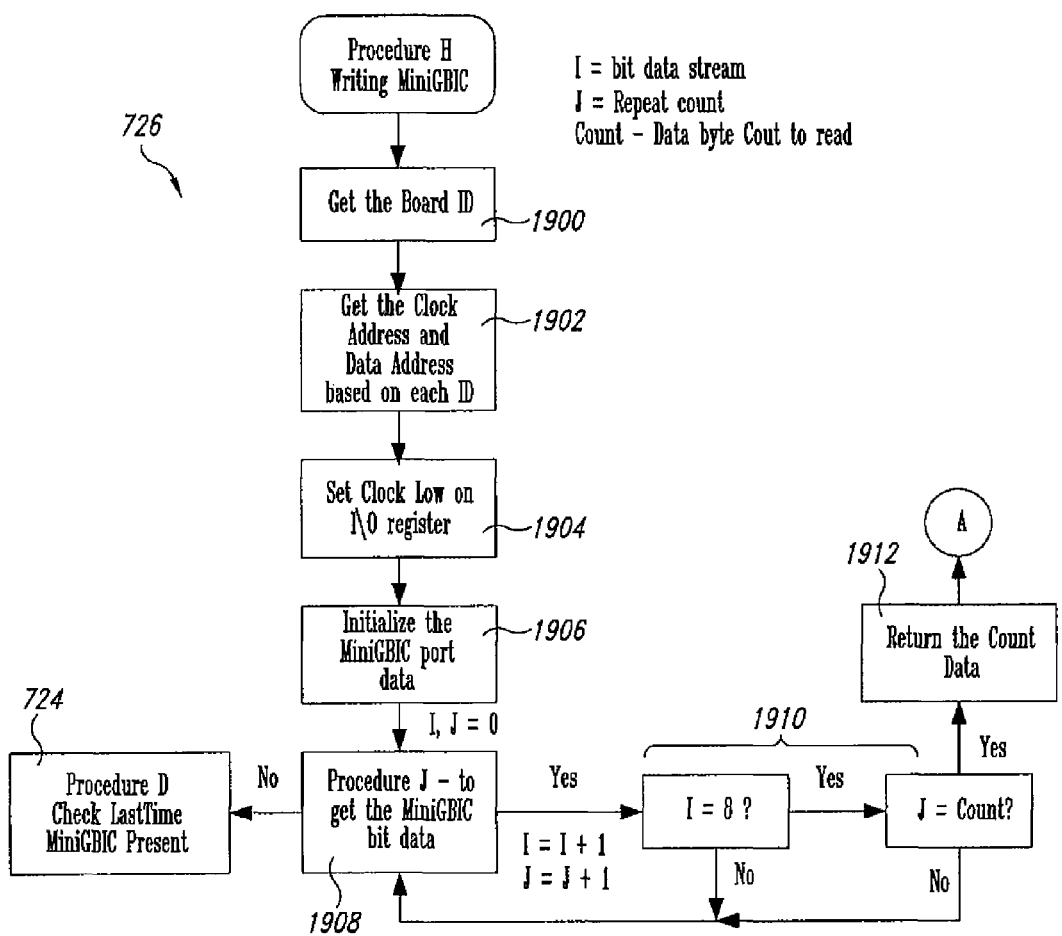
FIG. 19 is a flowchart of an embodiment of a procedure to write data to a transceiver.

FIG. 19 is a flowchart of an embodiment of a procedure (Procedure H from the block 726 of FIG. 7) to write data into an EEPROM of a transceiver 206. More specifically, Procedure H can be used to write data into the data input register 202, which is in turn written into the EEPROM of the corresponding transceiver 206. Procedure H may also be used to write directly into the EEPROM, without necessarily having to first write into the data input register 202.

At a block 1900, Procedure H gets the board ID (e.g., module ID). Based on the ID at a block 1902, the clock address and the transceiver data address are obtained from the memories 800 or 900 of FIG. 8 or 9, respectively. The clock for the data input register 202 is initialized/set low at a block 1904, and the data (bit stream into the port) is also initialized at 0 at a block 1906.

A block 1908 relates to a procedure (Procedure J), described in further detail with reference to FIG. 20, to write the data into the data input register 202 (or directly into the EEPROM). If there is a failure in writing the data during Procedure J, then Procedure D is performed at the block 724 to check the data from the last time (see, e.g., FIG. 15). Procedure J is performed until all of the data is written, using counts at block(s) 1910, until the written data is returned at a block 1912 to indicate that the writing operation was successful.

Figure 20:
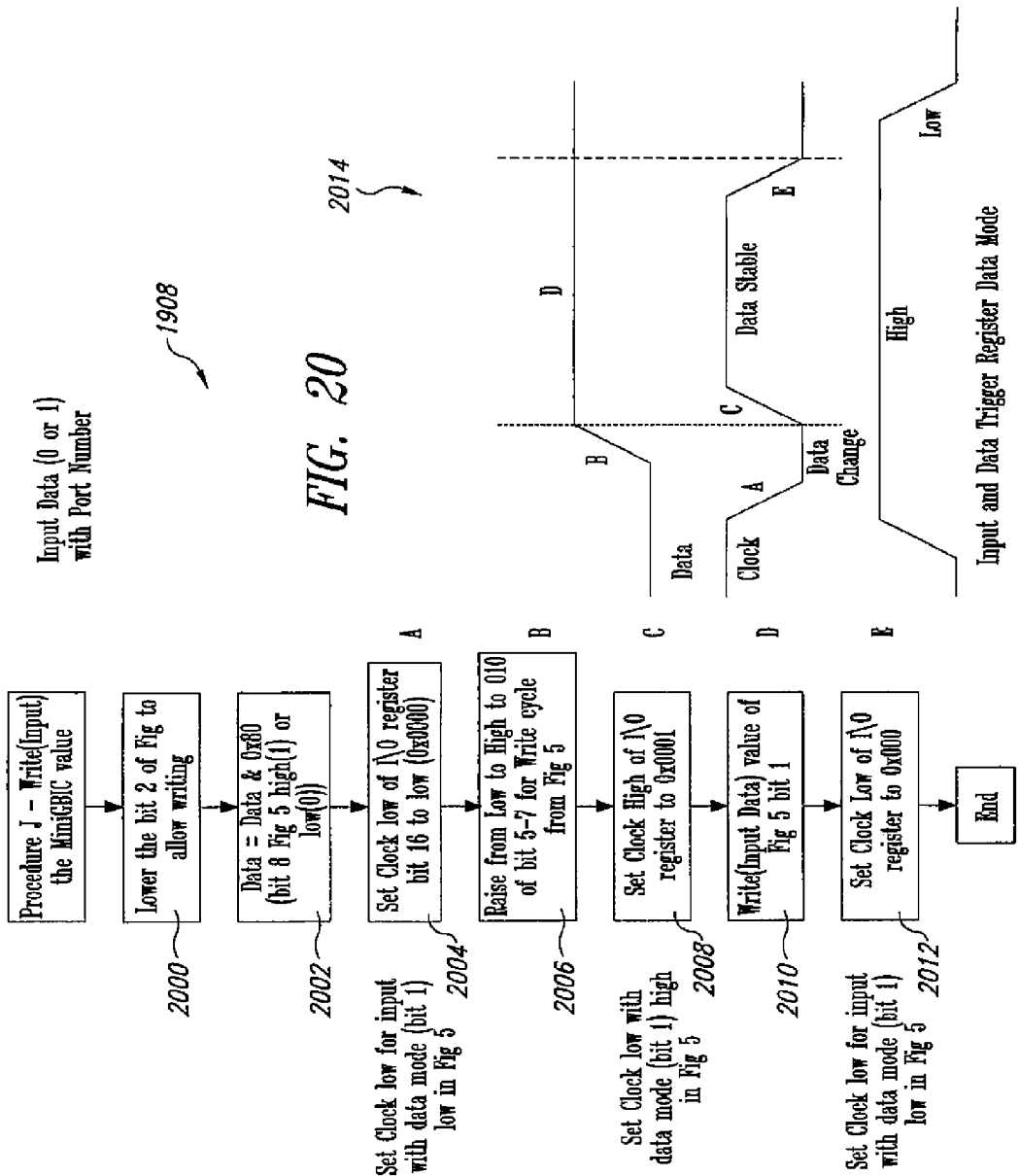
FIG. 20 is a flowchart of an embodiment of a procedure to write individual data bits to a transceiver.

FIG. 20 is a flowchart of an embodiment of Procedure J (from the block 1908 of FIG. 19) to write data into a transceiver 206, one bit at a time. The illustrated embodiment of Procedure J is also explained herein in the context of the bit designations 500 of FIG. 5. If there is a failure in writing the data during Procedure J, then Procedure D from FIGS. 7 and 15 is performed to recover data from the last time the particular transceiver 206 was written to.

At a block 2000, bit 2 of FIG. 5 is lowered (set low to a binary 0), to remove the I/O register from its tristated status and to place it in a data-input mode. The data to be written, whether a binary 0 or a binary 1, is set at bit 8 of FIG. 5 at a block 2002.

At a block 2004, bit 16 of FIG. 5 is set low to allow the module clock to trigger an input. If the data mode in bit 1 of FIG. 5 is low (corresponding to a binary 0 data bit in bit 8), then bits 5-7 of FIG. 5 are raised from low to high (from binary 001 to binary 010) for the write cycle at a block 2006.

At a block 2008, bit 16 is once again set low to allow the module clock to trigger an input. If the data mode in bit 1 of FIG. 5 is high (corresponding to a data change to a binary 1 data bit in bit 8), then this binary value from bit 1 is written at a block 2010.

A block 2012 depicts the next data change (to a binary 0), where bit 16 is again set low to allow the module clock to trigger an input, and the data mode in bit 1 is low for the binary 0 data bit. Timing diagrams 2014 further illustrate the clock cycles, transitions, data stream, and other operations described above.

Figure 23:
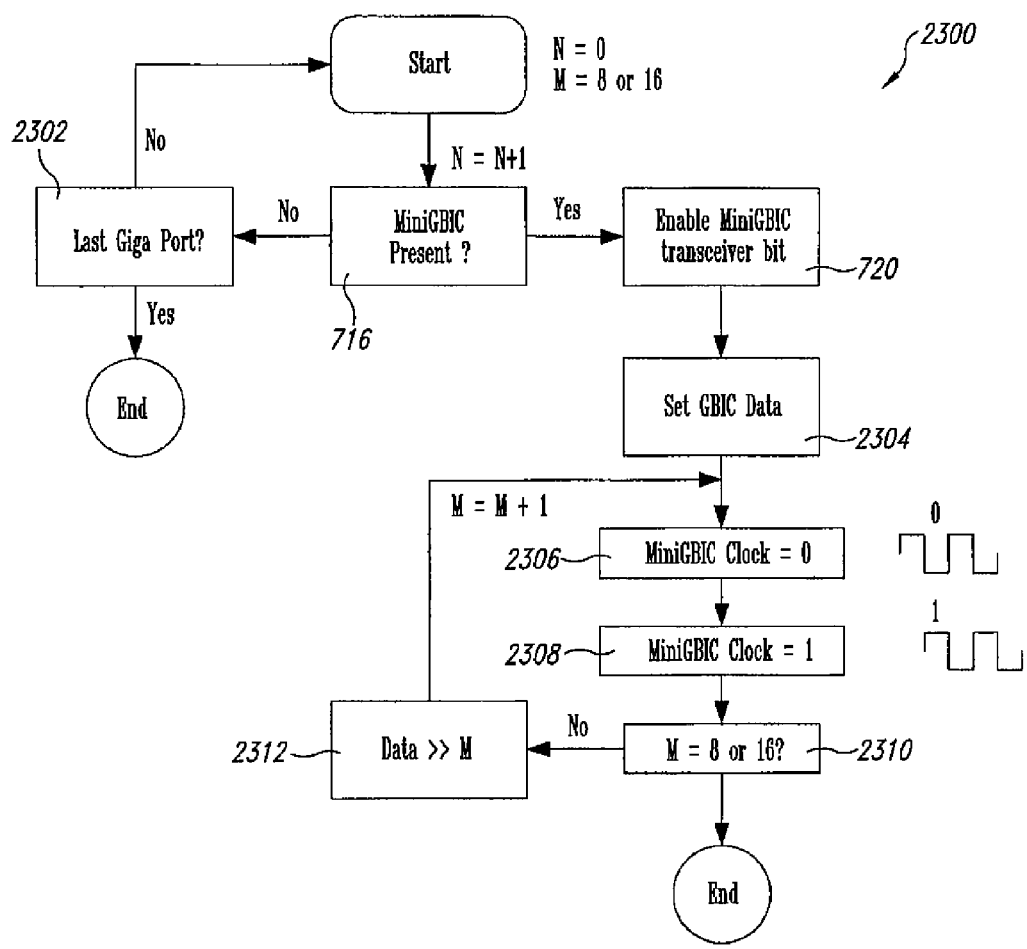
FIG. 23 is a flowchart of another embodiment of a procedure to write data to a transceiver.

FIG. 23 is a flowchart of another embodiment of a procedure 2300 to write data to a transceiver 206. The procedure 2300 may be used in addition or alternative to the Procedures H and J of FIGS. 19 and 20, respectively. The procedure 2300 is performed sequentially for each port in a module, where a block 2302 checks whether the last port in the module has been reached or written to. Blocks 716 (to determine presence of a transceiver 206 in the port) and 720 (to enable the transceiver 206 in the port to receive write data) are performed similarly as previously described above.

At a block 2304, the procedure 2300 sets or otherwise obtains the data to be written into the current transceiver 206, where the data may be received from a user or automatically from the host system. Then at consecutive clock low and high cycles at blocks 2306 and 2308, data is written to the transceiver 206, which may be performed by providing the data to the data input register 202 or by writing directly to the EEPROM. A block 2310 repetitively checks whether the last bit in the data input register 202, such as bit 8 or bit 16, has been reached. If the last bit has not been reached and there is more data to write at a block 2312, then the procedure 2300 continues until all of the data has been written and/or until there is no more room to write the data.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

For example, while the various figures have illustrated implementations that are based on binary values or based on high/low states, it is appreciated that these are merely illustrative. As a person skilled in the art having the benefit of this disclosure would appreciate, different binary values, high/low states, triggering mechanisms, numbering schemes (e.g., binary, decimal, hexadecimal, and so on), and other implementations can be used in other embodiments of the invention.

As yet another example, the various flowcharts of procedures illustrated and described herein are intended to explain some specific implementations. A person skilled in the art having the benefit of this discloser will readily appreciate that some of the operations depicted in the flowcharts can be combined, removed, or modified in accordance with various design parameters or preferences. The various data structures depicted herein are also understood to be illustrative and may be modified from one form to another.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
 a transceiver device that includes:
  a memory to store data; and
  a data field, in said memory, that includes 4 serial bit positions that each respectively correspond to an electronic or optical interface and that each respectively identify whether the corresponding electronic or optical interface is supported by said transceiver, and
  wherein said data field further include at least another bit position, subsequent to said 4 serial bit positions, that corresponds to another electronic or optical interface that is supported by said transceiver.

2. The apparatus of claim 1 wherein said another electronic or optical interface includes a manufacturer-specific electronic or optical interface with which said transceiver is configured to operate.

3. The apparatus of claim 1 wherein said transceiver includes a Gigabit Interface Converter (GBIC) device.

4. The apparatus of claim 3 wherein said GBIC device includes a mini-GBIC device.

5. The apparatus of claim 1 wherein said electronic or optical interface, which corresponds respectively to said 4 serial bit positions, is defined by at least one standard and includes:
 a 1000BASE-SX interface corresponding to a first bit position;
 a 1000BASE-LX interface corresponding to a second bit position;
 a 1000BASE-CX interface corresponding to a third bit position; and
 a 1000BASE-T interface corresponding to a fourth bit position.

6. The apparatus of claim 1 wherein a bit, in a particular bit position among the 4 serial bit positions, is set if the electrical or optical interface corresponding to said particular bit position is supported by said transceiver, and is unset if not supported by said transceiver.

7. The apparatus of claim 1 wherein said data field relates to an Ethernet compliance code.

8. An apparatus, comprising:
 a host device having a plurality of ports and configured to check each port for a transceiver;
  wherein if said check determines that said transceiver is present at one of said ports, the host device is configured to read data from a memory of said transceiver;
  wherein said ports are configured to have pluggable therein respective transceivers that include different transceiver types of different manufacturers;
  wherein the host device is configured to identify, based on said data that is read from said memory of said transceiver, a manufacturer and a transceiver type of said transceiver; and
 a management module in said host device and configured to, based on said identified manufacturer and transceiver type, operate said host device to meet an operating requirement of said transceiver;
 wherein said transceiver includes:
  said memory to store data; and
  a data field, in said memory, that includes 4 serial bit positions that each respectively correspond to an electronic or optical interface and that each respectively identify whether the corresponding electronic or optical interface is supported by said transceiver, and
  wherein said data field further include at least another bit position, subsequent to said 4 serial bit positions, that corresponds to another electronic or optical interface that is supported by said transceiver.

9. The apparatus of claim 8 wherein said transceiver includes a Gigabit Interface Converter (GBIC) device.

10. The apparatus of claim 9 wherein said GBIC device includes a mini-GBIC device.

11. The apparatus of claim 8 wherein said electronic or optical interface, which corresponds respectively to said 4 serial bit positions, is defined by at least one standard and includes:
   a 1000BASE-SX interface corresponding to a first bit position;
   a 1000BASE-LX interface corresponding to a second bit position;
   a 1000BASE-CX interface corresponding to a third bit position; and
   a 1000BASE-T interface corresponding to a fourth bit position.

12. The apparatus of claim 8 wherein a bit, in a particular bit position among the 4 serial bit positions, is set if the electrical or optical interface corresponding to said particular bit position is supported by said transceiver, and is unset if not supported by said transceiver.

13. The apparatus of claim 8 wherein said another electronic or optical interface includes a manufacturer-specific electronic or optical interface with which said transceiver is configured to operate.

14. The apparatus of claim 8 wherein said data field relates to an Ethernet compliance code.

15. A method for a host device, the method comprising:
   checking a plurality of ports of said host device for a transceiver;
   if said checking determines that said transceiver is present at one of said ports, reading data from a memory of said transceiver, wherein said ports are configured to have pluggable therein respective transceivers that include different transceiver types of different manufacturers;
   identifying, based on said data that is read from said memory of said transceiver, a manufacturer and a transceiver type of said transceiver; and
   based on said identified manufacturer and transceiver type, operating said host device to meet an operating requirement of said transceiver,
   wherein said transceiver includes:
      said memory to store data; and
      a data field, in said memory, that includes 4 serial bit positions that each respectively correspond to an electronic or optical interface and that each respectively identify whether the corresponding electronic or optical interface is supported by said transceiver, and
      wherein said data field further include at least another bit position, subsequent to said 4 serial bit positions, that corresponds to another electronic or optical interface that is supported by said transceiver.

16. The method of claim 15 wherein said another electronic or optical interface includes a manufacturer-specific electronic or optical interface with which said transceiver is configured to operate.

17. The method of claim 15 wherein said electronic or optical interface, which corresponds respectively to said 4 serial bit positions, is defined by at least one standard and includes:
   a 1000BASE-SX interface corresponding to a first bit position;
   a 1000BASE-LX interface corresponding to a second bit position;
   a 1000BASE-CX interface corresponding to a third bit position; and
   a 1000BASE-T interface corresponding to a fourth bit position.

18. The method of claim 15 wherein a bit, in a particular bit position among the 4 serial bit positions, is set if the electrical or optical interface corresponding to said particular bit position is supported by said transceiver, and is unset if not supported by said transceiver.

19. The method of claim 15 wherein said transceiver includes a Gigabit Interface Converter (GBIC) device.

20. The apparatus of claim 19 wherein said GBIC device includes a mini-GBIC device.

* * * * *